United States Patent Office 2,950,977
Patented Aug. 30, 1960

2,950,977
POULTRY CHILLING

John H. Silliker, Park Forest, Joseph L. Shank, Tinley Park, and Robert E. Murphy, Chicago, Ill., assignors to Swift & Company, Chicago, Ill., a corporation of Illinois No Drawing. Filed Aug. 30, 1957, Ser. No. 681,190

2 Claims. (Cl. 99—194)

This invention relates to a method for increasing the shelf-life of poultry. More particularly, this invention relates to the addition of a suspension of live bacterial cells to the chill water of freshly eviscerated poultry.

In recent times, in the area of distribution of fresh meats, and especially poultry, there has been a trend toward packaging these products in consumer sized containers. Poultry, after evisceration, is chilled, cut up into portion-sized pieces, packed into suitable containers generally known as trays, and wrapped with a protective film such as cellophane, regenerated cellulose, and the like. The tray-packs are then dry packed at about 45° F. and ultimately reach the consumer. A problem arising from this method of packaging and distribution is that of prevention of mold growth in the packages and spoilage of the birds during the shelf-life of the product, that is, the time between packaging and utilization by the consumer. The shelf-life of tray-packed dry pack poultry at a temperature of 45° F. after initial chilling is from six to nine days.

Many proposals have been advanced looking to improvements in chilling and packaging poultry in attempting to increase shelf-life. One method involves adding antibiotics to the chill water. While certain antibiotics in solution may serve to retard the rate of spoilage, some are relatively ineffective in preventing mold growth and others give no appreciable results in either respect. Some do not go into solution readily and are thus difficult to utilize. Another method proposes chlorination of the chill water, but this too failed to eliminate the problem.

It is a primary object of this invention, therefore, to provide a new, improved method of treating poultry to prolong the shelf-life thereof.

It is an additional object of this invention to provide a method for increasing the shelf-life of poultry, which is simple and easy to use and deviates only slightly from conventional treating methods.

It is a further object of this invention to provide a method of retarding spoilage and mold growth on tray packed, dry pack poultry in which reagents are added to the chill water.

Additional objects if not specifically set forth herein will be readily apparent to those skilled in the art from the following description of the invention.

Broadly it has been discovered that the shelf-life of poultry may be prolonged considerably beyond that period which is presently possible with conventional treatment methods. This extended protection from spoilage and mold formation is obtained through the addition of live, non-pathogenic lactic acid bacteria to poultry chill water, followed by the normal tray packing of the chilled birds. These lactic acid bacteria include Lactobacillus, Streptococcus, Leuconostoc and Pediococcus. The increase in shelf-life of poultry so treated depends upon the local production of lactic acid on the skin and other surfaces of the bird as a result of the growth and metabolism of bacterial cells and production of lactic acid.

More specifically it has been found, that when poultry is immersed in chill water containing lactic acid bacteria for periods of from about four to about seventy-two hours and subsequently dry packed at 45° F., it is possible to increase the shelf-life of such poultry from three to eight days over poultry chilled in water alone. The concentration of bacteria cells in the chill water is preferably between 100,000 and 10,000,000 per milliliter. Addition of cells in concentrations in excess of 10,000,000 per milliliter will produce the desired results, but in an uneconomical fashion as the results are not improved over those obtainable at lower levels. The method involves growing an organism of the lactic acid bacteria in an appropriate culture medium. The fully grown culture is centrifuged and the cells are suspended in water. The water suspension of cells is added to poultry chill water in which the warm eviscerated birds are placed. As a result of this treatment, the surface of the bird, as well as the body cavity, is inoculated with bacteria.

The examples are set out solely for purposes of illustration and are not intended to restrict the scope of the invention other than as is indicated in the appended claims.

EXAMPLE I

Sixty birds were separated into six groups of ten birds each. Two tests were conducted using three groups in each test. From the first three groups, one was utilized as a control. Chill water was prepared for each group from 30 gallons of water, and approximately 70 pounds of ice. Lactobacillus cells derived from a culture as described above were added to the second chill water to a concentration of about 100,000,000 cells per milliliter. Aureomycin was added to the third chill water to a concentration of 10 p.p.m. Thereafter, the three groups of birds were immersed in their respective chill tanks and held for 4 hours. The poultry was then tray-packed and dry packed at a temperature of 45° F. The second test utilizing the remaining three groups was conducted exactly as outlined above, and results were identical.

Table 1

| Group | Shelf-Life, Days |
|---|---|
| 1. Control | 8 |
| 2. Lactobacillus cells, 100,000,000 per milliliter in chill water | 11 |
| 3. Aureomycin, 10 p.p.m. in chill water | ¹11 |

¹ Mold growth.

As can be seen from the above, the birds treated with Lactobacillus cells had an increase in shelf-life of three days over birds chilled conventionally, and showed no evidence of mold growth. While the birds treated with Aureomycin also had a shelf-life increase of three days, there was evidence of mold growth at the end of that period.

EXAMPLE II

A second series of tests was conducted to determine the relative effect on shelf-life of Aureomycin, Lactobacillus cells and chlorine. Four groups of five birds each were used with one group as a control. The remaining three groups were treated with chill water containing respectively 10 p.p.m. Aureomycin, 100,000,000 cells per milliliter Lactobacillus cells and 10 p.p.m. chlorine. The birds were immersed in their respective baths for 4 hours and were tray packed and dry packed at a temperature of 45° F.

Table 2

| Group | Shelf-Life, Days |
|---|---|
| 1. Control | 6 |
| 2. Aureomycin, 10 p.p.m. in chill water | [1] 11 |
| 3. Lactobacillus cells, 100,000,000 cells per milliliter in chill water | 12 |
| 4. Chlorine, 10 p.p.m. in chill water | 6 |

[1] Mold growth.

It can be readily seen that chlorination of chill water has no noticeable effect on shelf-life. The Lactobacillus treated poultry showed the greatest increase in shelf-life and there was no mold growth as was evident on the birds treated with Aureomycin.

EXAMPLE III

In a third series of tests to determine the optimum concentration of Lactobacillus cells in the chill water, twenty-five birds were separated into five groups of five birds each with one group chilled conventionally and set aside as a control. The four remaining groups were treated with chill water containing 100,000, 1,000,000, 10,000,000 and 100,000,000 cells of Lactobacillus per milliliter respectively. All groups were immersed in their respective chill tanks and held for 4 hours. The poultry was ultimately tray packed and dry packed at a temperature of 45° F.

Table 3

| Group | Shelf-Life, Days |
|---|---|
| 1. Control | 9 |
| 2. Lactobacillus cells, 100,000 per milliliter in chill water | 11 |
| 3. Lactobacillus cells, 1,000,000 per milliliter in chill water | 13 |
| 4. Lactobacillus cells, 10,000,000 per milliliter in chill water | 14 |
| 5. Lactobacillus cells, 100,000,000 per milliliter in chill water | 13 |

It is seen from the above that a concentration of about 10,000,000 cells per milliliter of chill water will produce and optimum shelf-life of 14 days. Further increases in concentration have a diminishing effect on shelf-life.

EXAMPLE IV

A final series of tests was conducted to determine the relative effect of various antibiotics on poultry shelf-life. Fifteen birds were separated into five groups of three birds each and were treated with chill water containing 10 p.p.m. of Neomycin, Bacitracin, 21315, 07086 and Aureomycin respectively. The birds were immersed in their respective chill tanks for 4 hours and were tray packed and dry packed in a 45° F. cooler.

Table 4

| Antibiotic | Shelf-Life, Days |
|---|---|
| 1. Neomycin | [1] 7 |
| 2. Bacitracin, 10 p.p.m. in chill water | [1] 6 |
| 3. 21315, 10 p.p.m. in chill water | [1] 8 |
| 4. 07086, 10 p.p.m. in chill water | [1] 6 |
| 5. Aureomycin, 10 p.p.m. in chill water | [1] 11 |

[1] Mold growth.

It is apparent that Aureomycin is superior in effect on shelf-life to all other antibiotics tested. The Neomycin and Bacitracin had a disadvantage in that they did not go into solution readily. Those indicated by the numbers 21315 and 07086 are experimental antibiotics.

It is evident from the foregoing that it is possible by the application of the teachings of this invention to maintain satisfactory shelf-life of fresh poultry from three to eight days longer than that of birds conventionally chilled and packaged.

It is also evident that while Aureomycin, more than any other antibiotic tested, is effective as an additive to chill water in prolonging shelf-life, it is less effective than lactic acid bacteria and allows mold growth to begin at the end of the shelf-life period. The amounts of bacteria used are minute as compared to the weight of the poultry being treated. While in the foregoing description and examples we have directed attention particularly to the treatment of poultry with Lactobacillus, it will be appreciated that the same process is applicable to the use of other lactic acid bacteria such as Streptococcus, Leuconostoc and Pediococcus.

It is thus clear that many modifications and variations of the invention as hereinbefore set forth may be made without departing from its spirit and scope, and therefore only such limitations should be imposed as are indicated in the appended claims.

We claim:

1. In the process of increasing the shelf-life of freshly eviscerated poultry including immersing said poultry into chill water, the steps of adding a suspension of live non-pathogenic lactic acid bacterial cells to the chill water to a concentration of from about 100,000 to about 100,000,000 cells per milliliter of said chill water and holding said poultry in said chill water for at least about 4 hours.

2. The method of increasing the shelf-life of freshly eviscerated poultry which comprises: immersing said poultry in chill water to which has been added from about 100,000 to about 100,000,000 cells per milliliter of live, non-pathogenic lactic acid bacteria; holding said poultry in said chill water for from about four to about seventy-two hours; removing said poultry from said chill water; and cold dry packing said poultry at a temperature of about 45° F.

References Cited in the file of this patent

UNITED STATES PATENTS

| 1,380,069 | Kurk | May 31, 1921 |
| 1,685,630 | Drake | Sept. 25, 1928 |
| 2,225,783 | Jensen et al. | Dec. 24, 1940 |
| 2,687,961 | Ellis | Aug. 31, 1954 |
| 2,766,124 | Upham et al. | Oct. 9, 1956 |

OTHER REFERENCES

"Microbiology Of Meats," second edition, 1945 by L. B. Jensen, published by The Garrard Press, Illinois, pages 209 to 213, inclusive, article entitled Chilling Poultry.

"Food Engineering," January 1956, vol. 28, No. 1, pages 43 to 48, inclusive, and 194.